May 19, 1970  P. M. JONCAS  3,513,305
DIFFUSING SCREEN FOR A SEAL BEAM LIGHT

Filed Sept. 5, 1967  3 Sheets-Sheet 1

INVENTOR.
Phillip M. Joncas
BY
Victor J. Evans & Co.
ATTORNEYS

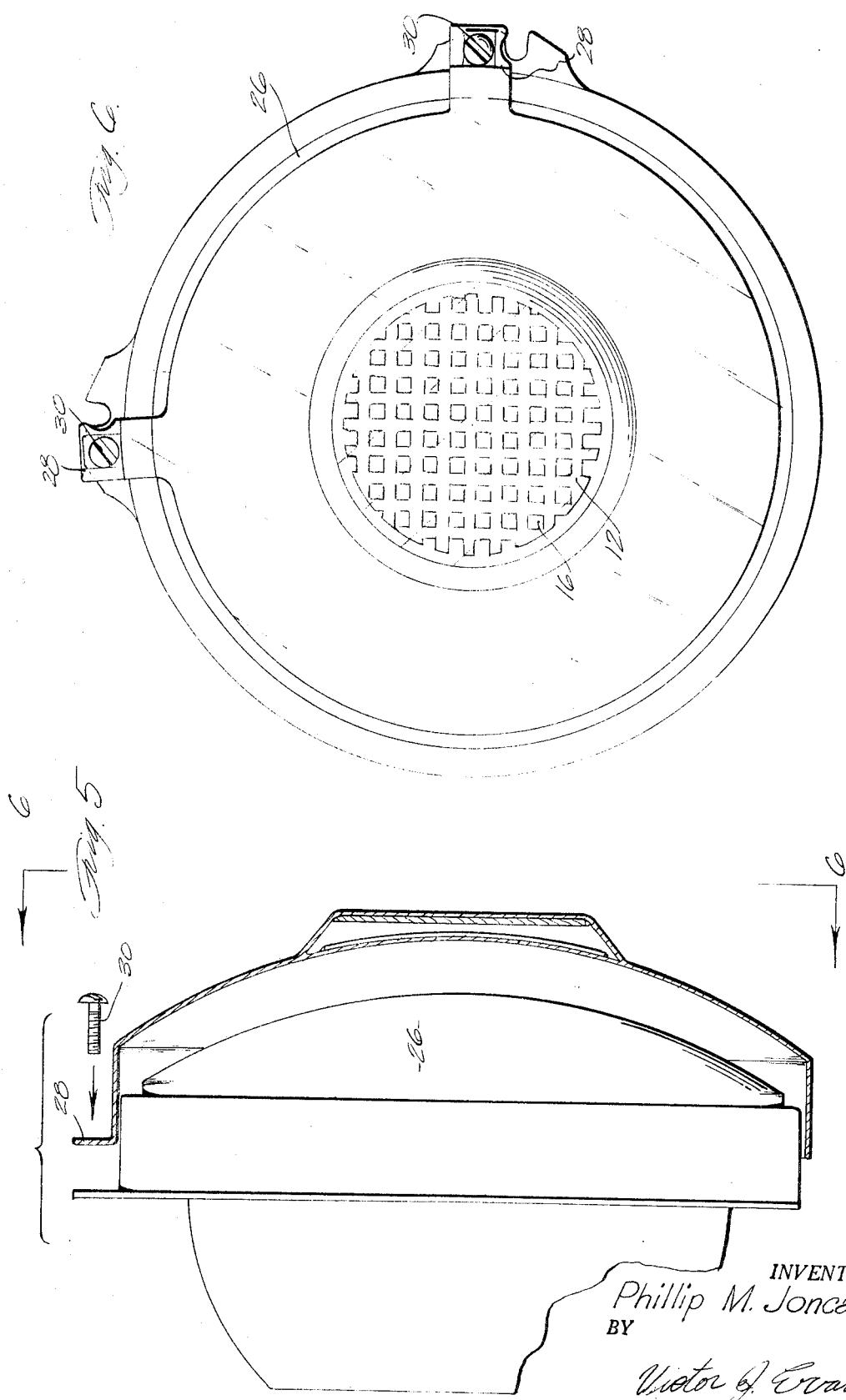

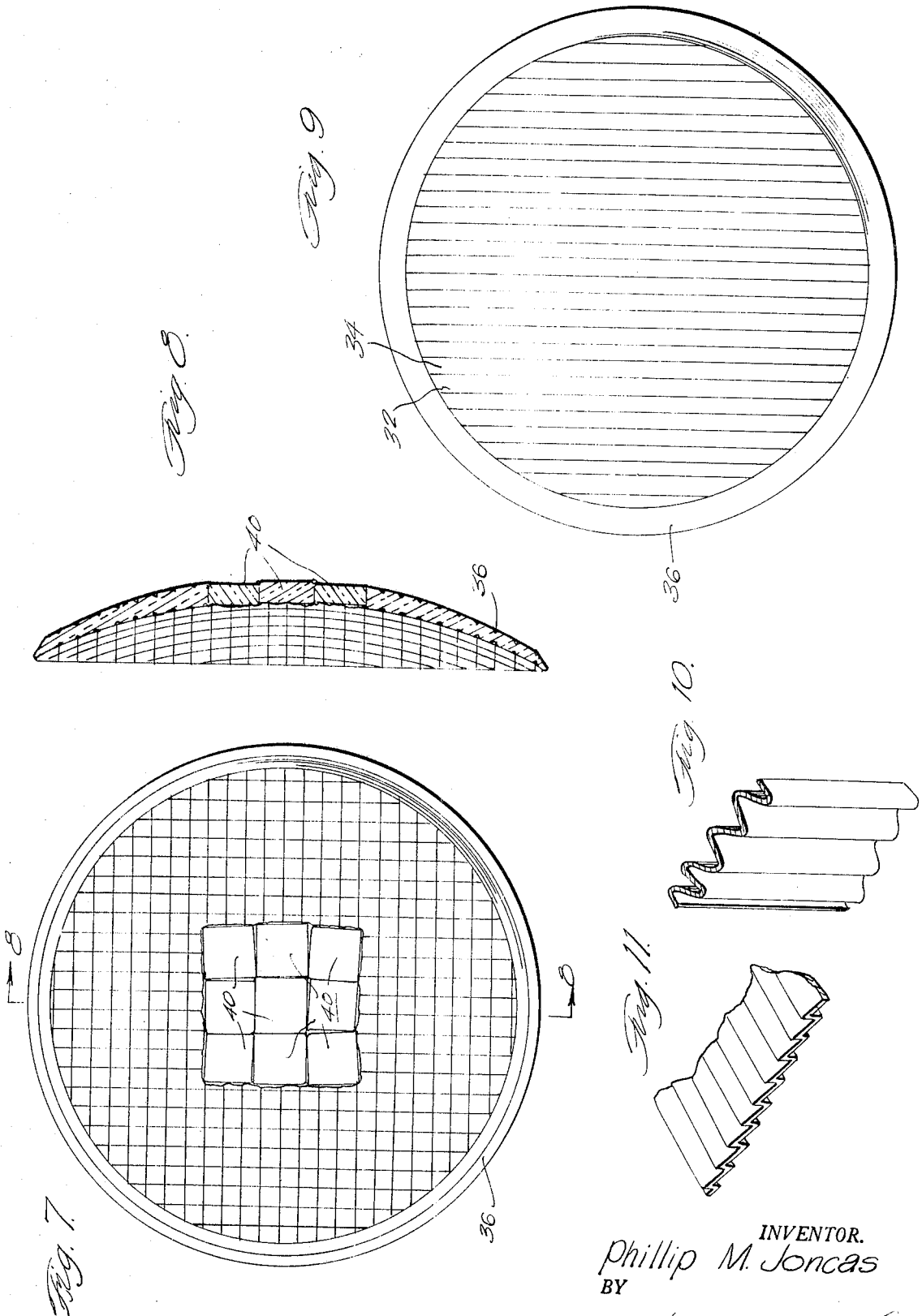

United States Patent Office 3,513,305
Patented May 19, 1970

1

3,513,305
DIFFUSING SCREEN FOR A SEAL BEAM LIGHT
Phillip M. Joncas, 3617 Penn Mar Ave.,
El Monte, Calif. 91732
Filed Sept. 5, 1967, Ser. No. 665,533
Int. Cl. F21v 9/08
U.S. Cl. 240—9.5
1 Claim

ABSTRACT OF THE DISCLOSURE

A diffusion screen for seal beam light units having an embossed screen disposed upon or over the lens of the seal beam units to provide improved use of light projected from the seal beam and to produce a superior white light. The diffusion screen includes a pie-shaped metal sheet with a plurality of square apertures in the central portion thereof, and an overlying screen with its square apertures rotated by an angle of 45° with respect to the apertures of the metal sheet. The screens have polarized transparent sheets covering their respective apertures for adjusting the transmissibility of light from the seal beam.

---

The invention concerns a device that will make possible the use of seal beam light at an operator's discretion without consternation to others. The object of the invention is to provide an improved diffusing screen for seal beam light units.

The above and other advantages and objects of the invention will become apparent upon full consideration of the following details, the description and accompanying drawings in which:

FIG. 5 is a side view partly in cross section showing how the diffusion screen is mounted on a seal beam lamp.

FIG. 6 is a side view taken along line 6—6 of FIG. 5.

FIG. 7 shows a detailed arrangement of a front face of a seal beam lens.

FIG. 8 is a cross section taken along line 8—8 thereof.

FIG. 9 is a further view of a front face of a seal beam lens.

FIGS. 10 and 11 are the detailed views and partly broken away sections of further features of the present invention.

Figure 4:
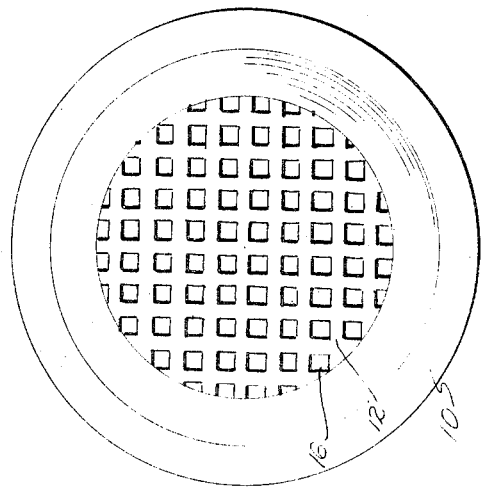
FIG. 4 is a view taken along lines 4—4 of FIG. 2.
Figure 3:
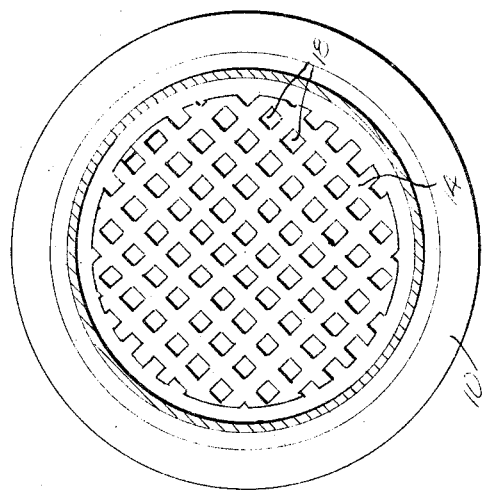
FIG. 3 is a cross-sectional view taken along line 3—3 of FIG. 2.
Figure 1:
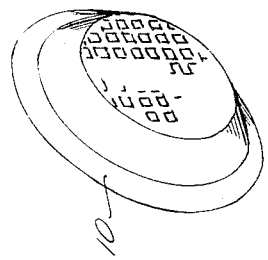
FIG. 1 is a reduced perspective view of the diffusion screen.
Figure 2:
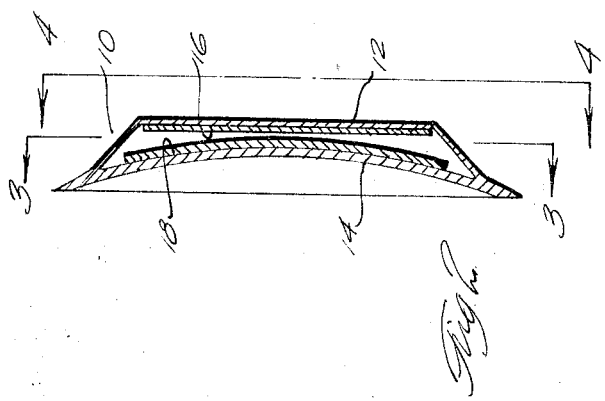
FIG. 2 is a cross-sectional view thereof taken along a diameter.

Referring to the drawings, there is shown in FIG. 1 the diffusion lens or screen 10 and having a cross section construction as shown in FIG. 2 in which there are square aperture circular sections 12, 14 over which are provided transparent polarized sheets 16, 18. The preferred embodiment of the invention arranges the squares of the screen 12, 14 at a 45° relation to each other as shown. The edge of the screen 10 extends along an arcuate surface to the periphery of a seal beam light 26 shown in FIG. 5, and the screen terminates in a flange 28 that is held in place by a screw 30 that is used to

2 connect the bezel ring of the seal beam light in conventional manner.

By use of the arrangement of the present invention there is found the added results and objects that are set forth above together with the disappearance of glare, brighter light, and by placing the apertured portions of the respective screens 12, 14 in the center of the seal beam light lens, there is provided enhanced production and transmission of light. While the invention is found to be contingent upon the characteristics of light so that the nature of light is compared with osmosis and capillary action, it is found that the invention resides in the structural relationships and features that are shown in the drawings.

FIGS. 7-11 show configurations employing the surface of the seal beam lens to maximum arrangements, FIGS. 7-9 showing a lens 36. FIG. 9 shows a polaroid in which one strip 32 is positive and the next adjacent strip 34 is alternate thereto and so on, being a negative strip, so that when they are turned it forms a blind.

The lens may be arranged to have a saw tooth or grated effect as shown in FIGS. 10 and 11 so that when vehicles pass each other, the lenses do not project light onto the other vehicles.

FIGS. 7 and 8 more particularly show the laminated cubicle 40 to provide the production of light from the seal beam lens.

Additional embodiments of the invention in this specification will occur to others, and therefore it is intended that the scope of the invention be limited only by the appended claims and not by the embodiments described hereinabove. Accordingly, reference should be made to the following claim in determining the full scope of the invention.

What is claimed is:

1. A diffusing screen comprising a pie-shaped metal sheet having symmetrically arranged square apertures throughout a central portion thereof, and an overlying screen symmetrically disposed therewith and having further square apertures rotated by 45° to said metal sheet, each of the sets of apertures having overlying thereon a polarized sheet to adjust the transmissibility of light from a seal beam lens, a flange disposed above the periphery of the diffusing screen for holding the screen onto the bezel ring mounting of the seal beam, and a laminated cubicle of glass disposed in the lens of the seal beam lens.

References Cited

UNITED STATES PATENTS

| 2,180,114 | 11/1939 | Land | 240—9.5 |
| 2,260,736 | 10/1941 | Benton | 240—41.4 |
| 2,263,684 | 11/1941 | Ryan | 240—9.5 |
| 2,440,103 | 4/1948 | Land | 240—9.5 |
| 2,791,680 | 5/1957 | Bailey | 240—46.59 |
| 2,907,249 | 10/1959 | Hjermstad | 240—41.4 |
| 3,016,454 | 1/1962 | Simms | 240—46.03 |

NORTON ANSHER, Primary Examiner

F. L. BRAUN, Assistant Examiner

U.S. Cl. X.R.

240—46.59